United States Patent
Wang

(10) Patent No.: US 8,819,133 B2
(45) Date of Patent: Aug. 26, 2014

(54) METHOD, SYSTEM, AND DEVICE FOR CONTROLLING A TOKEN FOR AN AUXILIARY STREAM IN A MULTI-POINT DOUBLE-STREAM CONFERENCE

(75) Inventor: Haifeng Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 12/815,052

(22) Filed: Jun. 14, 2010

(65) Prior Publication Data

US 2010/0250679 A1  Sep. 30, 2010

Related U.S. Application Data

(63) Continuation of application No. PCT/CN2008/073452, filed on Dec. 11, 2008.

(30) Foreign Application Priority Data

Dec. 14, 2007 (CN) .......................... 2007 1 0179568

(51) Int. Cl.
```
G06F 15/16     (2006.01)
H04L 29/06     (2006.01)
H04M 3/56      (2006.01)
H04N 7/15      (2006.01)
H04N 7/26      (2006.01)
```
(52) U.S. Cl.
CPC ............. *H04L 65/403* (2013.01); *H04M 3/567* (2013.01); *H04N 7/15* (2013.01); *H04N 19/00424* (2013.01)
USPC ............................. 709/204; 709/206; 709/207

(58) Field of Classification Search
USPC ........................................................ 709/204
See application file for complete search history.

(56) References Cited

U.S. PATENT DOCUMENTS

2002/0033880 A1* 3/2002 Sul et al. .................... 348/14.09
2002/0094831 A1* 7/2002 Maggenti et al. ............. 455/518

(Continued)

FOREIGN PATENT DOCUMENTS

CN  1601990 A  3/2005
CN  1615015 A  5/2005

(Continued)

OTHER PUBLICATIONS

Examination Report of corresponding European Patent Application No. 08870774.0, mailed Dec. 13, 2011, 6 pages total.

(Continued)

*Primary Examiner* — Richard G Keehn
(74) *Attorney, Agent, or Firm* — Huawei Device Co., Ltd.

(57) ABSTRACT

The present invention discloses a method, a system, and a device for controlling a token for an auxiliary stream in a multi-point double-stream conference. In the multi-point double-stream conference, a Multipoint Control Unit (MCU) receives a token depriving request message, judges whether to execute the token depriving according to the identifier carried in the token depriving request message, and deprives the token when deciding to execute the token depriving. The solution of the present invention effectively solves the problem that the auxiliary stream token is held by a certain conference terminal for a long time and the sending of an emergent and important auxiliary stream is disturbed and provides for the control of the auxiliary stream token in a multi-point double-stream conference to facilitate the need of a user.

7 Claims, 5 Drawing Sheets

(56) References Cited

U.S. PATENT DOCUMENTS

| | | | |
|---|---|---|---|
| 2003/0235184 A1* | 12/2003 | Dorenbosch et al. | 370/352 |
| 2004/0028200 A1 | 2/2004 | Carlson | |
| 2004/0179689 A1* | 9/2004 | Maggenti et al. | 380/270 |
| 2004/0221010 A1* | 11/2004 | Butler | 709/204 |
| 2005/0286444 A1* | 12/2005 | Yang et al. | 370/261 |
| 2006/0244818 A1 | 11/2006 | Majors | |
| 2007/0192844 A1* | 8/2007 | Chen et al. | 726/11 |
| 2007/0249381 A1* | 10/2007 | Forslow | 455/517 |
| 2008/0068449 A1* | 3/2008 | Wu et al. | 348/14.09 |
| 2008/0194279 A1* | 8/2008 | Choksi et al. | 455/518 |
| 2008/0220765 A1* | 9/2008 | Chu et al. | 455/422.1 |
| 2009/0019047 A1* | 1/2009 | Anderson et al. | 707/8 |
| 2009/0037736 A1* | 2/2009 | Djordjrvic et al. | 713/170 |
| 2010/0226289 A1* | 9/2010 | Maenpaa | 370/260 |

FOREIGN PATENT DOCUMENTS

| | | |
|---|---|---|
| CN | 101115183 A | 1/2008 |
| CN | 101262588 A | 9/2008 |
| GB | 02402014 A | 11/2004 |
| GB | 2403865 A | 1/2005 |
| JP | 63001139 A | 1/1988 |
| JP | 2005197945 | 7/2005 |

OTHER PUBLICATIONS

ITU-T Series H: Audiovisual and Multimedia Systems; Infrastructure of audiovisual services—Systems and terminal equipment for audiovisual services; ITU-T Recommendation H.323: Packet-based multimedia communications systems, Nov. 9-10, 2000, total 235 pages.

ITU-T Series H: Audiovisual and Multimedia Systems; Infrastructure of audiovisual services—Systems aspects; ITU-T Recommendation H.239: Role management and additional media channels for H.300-series terminals, Jul. 2003, total 32 pages.

Chinese office action issued in corresponding Chinese patent Application No. 200710179568.4, dated Jan. 22, 2010 and English translation thereof, total 15 pages.

European search report issued in corresponding European patent Application No. 08870774.0, dated Apr. 9, 2010, total 6 pages.

English Translation of the Written Opinion of the International Search Authority for PCT application No. PCT/CN2008/073452, dated Mar. 19, 2009, total 6 pages.

Second Office Action of corresponding Chinese Patent Application No. 200710179568.4, mailed Aug. 3, 2011, and partial English translation thereof, 11 pages total.

Foreign communication from a Related Counterpart Application—International Search Report, PCT/CN2008073452, Mar. 19, 2009, 4 pages.

Fourth Office Action of corresponding Chinese Patent Application No. 200710179568.4, mailed on May 4, 2012, and English translation thereof, 12 pages total.

Third Office Action of corresponding Chinese Patent Application No. 200710179568.4, mailed Dec. 31, 2011, and English translation thereof, 12 pages total.

Rejection decision issued in corresponding Chinese application No. 200710179568.4, dated Sep. 29, 2012, and an English translation thereof, total 10 pages.

* cited by examiner

METHOD, SYSTEM, AND DEVICE FOR CONTROLLING A TOKEN FOR AN AUXILIARY STREAM IN A MULTI-POINT DOUBLE-STREAM CONFERENCE

CROSS-REFERENCE TO RELATED APPLICATIONS

This application is a continuation of International Application No. PCT/CN2008/073452, filed on Dec. 11, 2008, which claims priority to Chinese Patent Application No. 200710179568.4, filed on Dec. 14, 2007, both of which are hereby incorporated by reference in their entireties.

FIELD OF THE INVENTION

The present invention relates to the communication technical field, and in particular, to a method, a system, and a device for controlling a token for an auxiliary stream in a multi-point double-stream conference.

BACKGROUND OF THE INVENTION

In an H.323 protocol-based multi-point double-stream video-conferencing system, a centralized conference mode exists. This mode is the most widely used mode. In this mode, the video and audio streams on each conference terminal in a conference are controlled by a Multipoint Control Unit (MCU) in a centralized way. All the conference terminals participating in the conference set up calls with only the MCU, and send the code streams including the main stream and auxiliary stream to the MCU. The MCU performs necessary processing for the code streams, and selectively sends the code streams to each conference terminal. In addition, the MCU sends conference control signaling to each conference terminal and controls the exchange and transmission of video and audio code streams to implement the specific conference control function.

With the existing technology, the double-stream function of the multi-point double-stream video-conferencing system is implemented in compliance with the H.239 standard protocol. The H.239 protocol describes how to control and indicate the auxiliary stream through H.245 signaling and the capability exchange mechanism in an H.323 protocol-based video-conferencing system. A presentation type of auxiliary stream exists in the multi-point double-stream video-conferencing system. The auxiliary stream is controlled in the role management process. Specifically, for a presentation type of auxiliary stream, the role management process is based on the token mechanism. That is, a specific auxiliary stream token must be obtained before the conference terminal in a conference sends the local auxiliary stream. At any time, only one conference terminal holds the token in a conference to send the auxiliary stream.

As stipulated by the H.239 protocol, in a multi-point double-stream conference system, the MCU controls the delivery of the auxiliary stream token. That is, each conference terminal must request an auxiliary stream token from the MCU before sending the auxiliary stream. The MCU determines whether the token can be delivered to the requesting conference terminal based on the holding of the token in the current conference. After receiving a token response from the MCU, the conference terminal can open the auxiliary stream channel to send the auxiliary stream and periodically send a message indicating the holding of the token to the MCU. The MCU forwards the message to all the conference terminals in the conference. When a conference terminal wants to release the token without sending the auxiliary stream, the terminal sends a token release indication to the MCU. After receiving the indication, the MCU deems that the auxiliary stream token in the current conference is in the idle state, and other conference terminals can apply to the MCU for the token.

During the implementation of the present invention, the inventor discovers the following disadvantages in the existing technology:

In many actual application scenarios, the MCU needs to forcibly deprive the token from a conference terminal in a conference and then deliver the token to another conference terminal, so that the conference terminal can obtain the auxiliary stream token smoothly. For example, when a conference terminal in a conference needs to present an important film image to participants, but the auxiliary stream token in the current conference is occupied by another conference terminal for a long time and cannot be released instantly. As a result, the conference terminal cannot obtain the right to send the auxiliary stream in time, thus affecting the conference progress. In the H.239 protocol, token request and release mechanisms are regulated, but no token depriving mechanism is described. In this case, the MCU as the conference control center fails to control the release of an auxiliary stream token in the conference and cannot fully control the auxiliary stream token. In serious cases, for example, when an exception occurs on the conference terminal with the token, a conference has to be held again.

SUMMARY OF THE INVENTION

A method, system, and a device for controlling the token for auxiliary stream in a multi-point double-stream conference are provided herein to solve the problem that the MCU fails to fully control the release of the token for auxiliary stream in the conference.

An embodiment of the present invention is implemented through the following technical solutions.

A method for controlling a token for an auxiliary stream in a multi-point double-stream conference is provided in an embodiment of the present invention. When the first conference terminal holds the token in the conference and sends an auxiliary stream, the second conference terminal requests the depriving of the token. The method includes:

receiving, by an MCU, a token depriving request message;

judging, by the MCU, whether to execute token depriving according to the ID carried in the token depriving request message; and depriving the token from the first conference terminal when the MCU determines to execute the token depriving.

A system for controlling a token for an auxiliary stream in a multi-point double-stream conference is provided in an embodiment of the present invention. The system includes an MCU and at least two conference terminals, such as the first conference terminal and the second conference terminal. When the first conference terminal holds the token in a multi-point double-stream conference and sends an auxiliary stream, and the second conference terminal requests the depriving of the token, the MCU is adapted to receive a token depriving request message, judge whether to execute token depriving according to the ID carried in the token depriving request message, and then deprive the token from the first conference terminal when it determines to execute the token depriving.

An MCU is provided in an embodiment of the present invention. The unit includes:

a token depriving request message receiving module, adapted to receive a token depriving request message on each conference terminal in a multi-point double-stream conference;

a token depriving judging module, adapted to judge whether to deprive the token from the first conference terminal according to the ID carried in the received token depriving request message; and a token depriving request module, adapted to receive the judgment result made by the token depriving judgment module. When a token is to be deprived, the token depriving request module executes the token depriving request operation and receives a token depriving request response message fed back by the conference terminal with a token.

A chairman conference terminal is provided in an embodiment of the present invention. The terminal includes:

a token request message receiving and sending terminal, adapted to receive and send a token request message;

a token depriving judging module, adapted to: judge whether to deprive the token of the current conference terminal according to the ID carried in the received token request message, and send the judgment result; and a token depriving request message sending terminal, adapted to: receive the judgment result by the token depriving judging module, and send a token depriving request message that carries the chairman conference terminal ID to the MCU when the token is to be deprived.

The preceding technical solution provided in embodiments of the present invention shows that by judging whether the token depriving can be executed according to the ID carried in the token depriving request message after the MCU receives the token depriving request message, and executing the specific token depriving by the MCU when the MCU determines to execute the token depriving, the preceding solution effectively solves the problem that the auxiliary stream token is held by a certain conference terminal for a long time and the sending of an emergent and important auxiliary stream is disturbed, realizes the absolute control of the auxiliary stream token in a multi-point double-stream conference, and meets the need of user.

DETAILED DESCRIPTION OF THE EMBODIMENTS

The following section explicitly describes the complete technical solution provided in the embodiments of the present invention. Obviously, only certain embodiments of the present invention are presented herein. All the other embodiments obtained by those skilled in the art without creative work based on the embodiments of the present invention are protected by the present invention.

Figure 1:
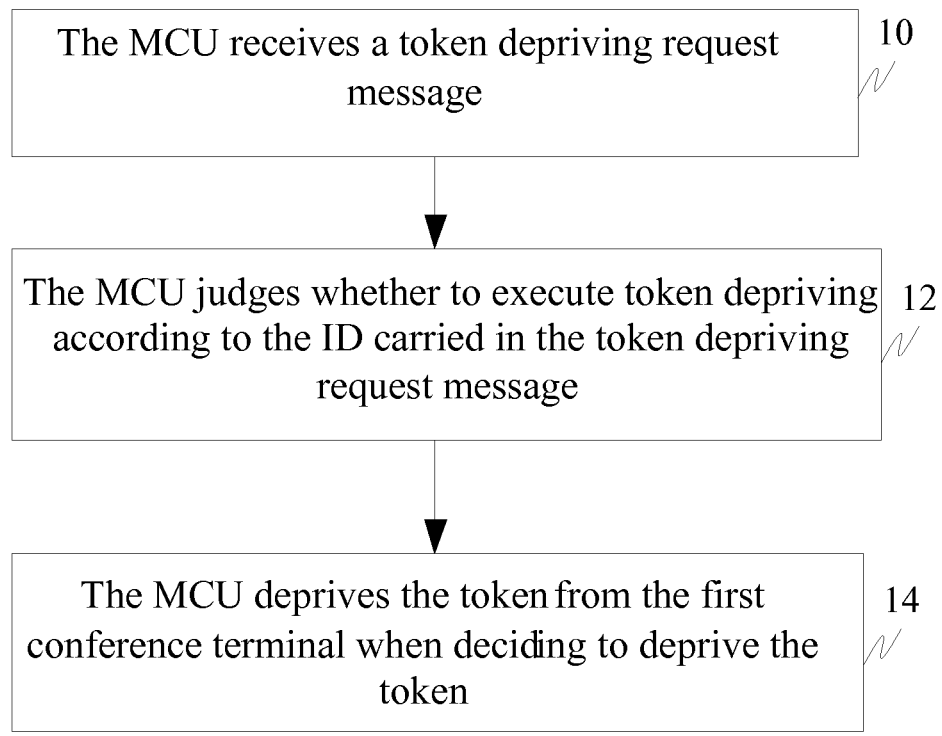
FIG. 1 is a flowchart of a method for controlling a token for an auxiliary stream provided in an embodiment of the present invention.

In the multimedia video-conferencing system, the double-stream mode is more and more widely used. The double streams indicate that all the conference terminals in a conference receive and send two channels of video code streams at the same time. One channel of code stream for moving picture people is called "main stream" and is adapted to send the main video code stream of the conference terminal. The other channel of code stream for contents is called "auxiliary stream" and is adapted to send auxiliary pictures or video images such as slides. Based on the H.239 protocol, the embodiment of the present invention are used in the scenario where the first conference terminal holds a token and sends auxiliary streams and the second conference terminal requests a token in a multi-point double-stream conference. In the embodiment of the present invention, the MCU executes the token depriving. FIG. 1 is a flowchart of a method for controlling a token for an auxiliary stream provided in an embodiment of the present invention. The method includes: After the MCU receives a token depriving request message (block 10), the MCU judges whether to execute the token depriving according to an identifier (ID) carried in the token depriving request message (block 12), that is, whether to release the token of the current conference terminal. The ID carried in the token depriving request message may be an MCU Terminal (MT) ID. When the MCU determines to execute the token depriving, the MCU deprives the token of the first conference terminal (block 14). Based on the token depriving request message, the MCU is requested to deprive the auxiliary stream token of the current conference terminal. That is, the token for the auxiliary stream is requested from the MCU. The MT ID is the MT ID of the conference terminal (the second conference terminal) sending the token depriving request message. The MT ID is allocated uniformly by the MCU to each conference terminal when the terminal participates in the conference. The MT ID corresponds to a conference terminal one by one and is used to uniquely identify a conference terminal in the conference. Most conference control functions of the MCU are specified to a relevant conference terminal according to an MT ID.

The chairman conference terminal is preferably configured to have the capability to implement some special conference control functions, for example, broadcasting the conference terminal, muting the conference terminal, and implementing roll call for speech, through the MCU. When the chairman conference terminal exists in a conference, the MCU executes the token depriving according to the token depriving request message if the message carries the MT ID of the chairman conference terminal; otherwise, the MCU does not execute this operation.

If the MCU receives the release messages from multiple conference terminals concurrently, the MCU decides to deliver the deprived token to the conference terminal with the highest priority. The priority of each conference terminal can be preset in advance.

A method for controlling a token for an auxiliary stream in a multi-point double-stream conference is provided in a first embodiment of the present invention. In this embodiment, the chairman conference terminal does not exist. The method is described in detail as follows:

A conference terminal requesting the depriving of the token sends a token depriving request message with the MT ID of the conference terminal. After receiving this message, the MCU judges whether to deprive the token of the current conference terminal according to the MT ID of the conference terminal requesting a token and the internal policy. If the MCU decides to deprive the token, the MCU executes the token depriving; otherwise, the MCU ends this operation. The internal policy for the MCU to judge whether to deprive the token varies with MCUs. The policy can be but not limited to one of the following:

The MCU reports the MT ID of the conference terminal sending a token depriving request message to the service processing layer. This layer determines whether to execute the token depriving, such as manual operation; or a pool of MT IDs with the permission to deprive a token for an auxiliary stream can be set on the MCU in advance. The MCU determines whether to execute the depriving operation by judging whether the MT ID in the token depriving request message exists in the pool.

The specific operation of the MCU to deprive the token can be in, but not limited to, one of the following modes:

Mode 1: The token depriving request message presentationTokenRelease is sent to the current conference terminal with the token, and then the token response message presentationTokenResponse is sent to the conference terminal currently requesting a token, and subsequently the holding state of the token in the conference is updated to the non-holding state.

Mode 2: A token request message is sent to the current conference terminal with the token, and the symmetryBreaking field in the message is set to 0. After the conference terminal with the token receives this message, this terminal must release the token because the symmetryBreaking field is set to 0. Subsequently, the MCU sends a token response message to the conference terminal currently requesting a token, and updates the holding state of the token in the conference to the non-holding state.

If the MCU receives a request or release message from multiple conference terminals concurrently, the MCU decides to deliver the deprived token to the conference terminal with the highest priority. That is, a token response message is sent to a high-priority conference terminal.

In this embodiment, after receiving a token depriving request message, the MCU determines whether to deprive a token according to the MT ID of the conference terminal requesting a token. The preceding solution effectively solves the problem that the token is held by a conference terminal in a multi-point double-stream conference for a long time and the sending of an emergent and important auxiliary stream is disturbed, realizes the absolute control of the token by the MCU, and meets the need of user in the multi-point double-stream conference.

A method for controlling a token for an auxiliary stream in a multi-point double-stream conference is provided in a second embodiment of the present invention. In this embodiment, the chairman conference terminal exists. The method is described in detail as follows:

A conference terminal requesting the depriving of the token sends a token request message with the MT ID of the conference terminal. After receiving this message, the MCU obtains the token from the conference terminal holding the token. When failing to obtain the token, the MCU sends the request message to the chairman conference terminal. The chairman conference terminal determines whether to deprive the token of the current conference terminal or to keep the existing token holding state unchanged according to the MT ID of the conference terminal requesting a token and the internal policy. When the chairman conference terminal decides to deprive the token of the current conference terminal, the chairman conference terminal sends a token depriving request message with the MT ID of the chairman conference terminal to the MCU. After receiving the token depriving request message, the MCU judges whether the MT ID carried in the message is the MT ID of the chairman conference terminal. If yes, the MCU executes the subsequent token depriving according to the specific content of the message; otherwise, the MCU does not execute this operation. In addition to the mode specified in the first embodiment, the MCU can deprive the token in the following mode: If the MCU determines that the MT ID in the token depriving request message is the MT ID of the chairman conference terminal in the current conference, and the auxiliary stream token of the conference is held by a non-chairman conference terminal, the MCU executes the subsequent depriving operation.

After receiving a token request message, the MCU checks the token holding condition of the current conference and executes the operation of obtaining the token from the token holding terminal. The specific operation includes: The MCU sends a token request message to the token holding terminal. When the token holding terminal agrees to release the token, the token holding terminal sends a presentationTokenResponse message to the MCU. The MCU updates the token holding condition in the conference and forwards the response message to the conference terminal requesting a terminal. When the token holding terminal has no response or refuses to release the token, the MCU fails to obtain the token, and the process proceeds to the subsequent token depriving.

The internal policy of the chairman conference terminal varies with the chairman conference terminals. The policy can be as follows: Each chairman conference terminal notifies a terminal in the chairman conference terminal of the received token request message and the terminal in the chairman conference terminal determines whether to execute the depriving operation.

Figure 2:
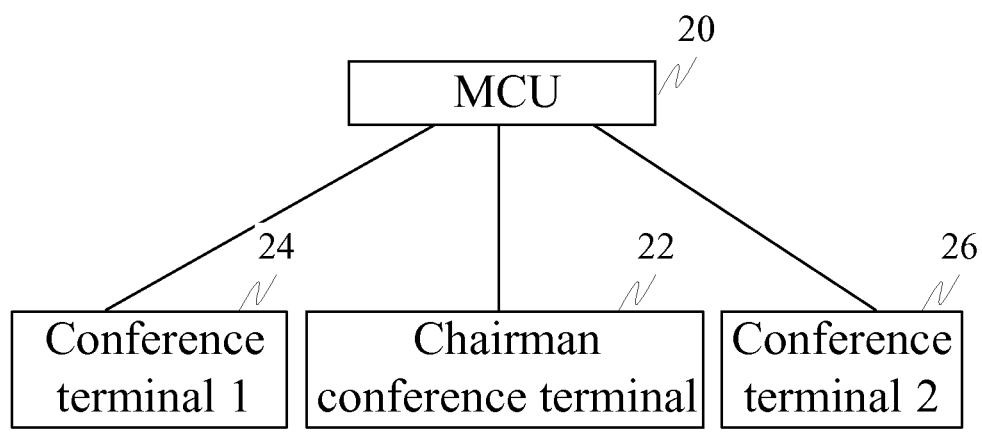
FIG. 2 shows an application scenario of an implementation mode provided in an embodiment of the present invention.
Figure 3:
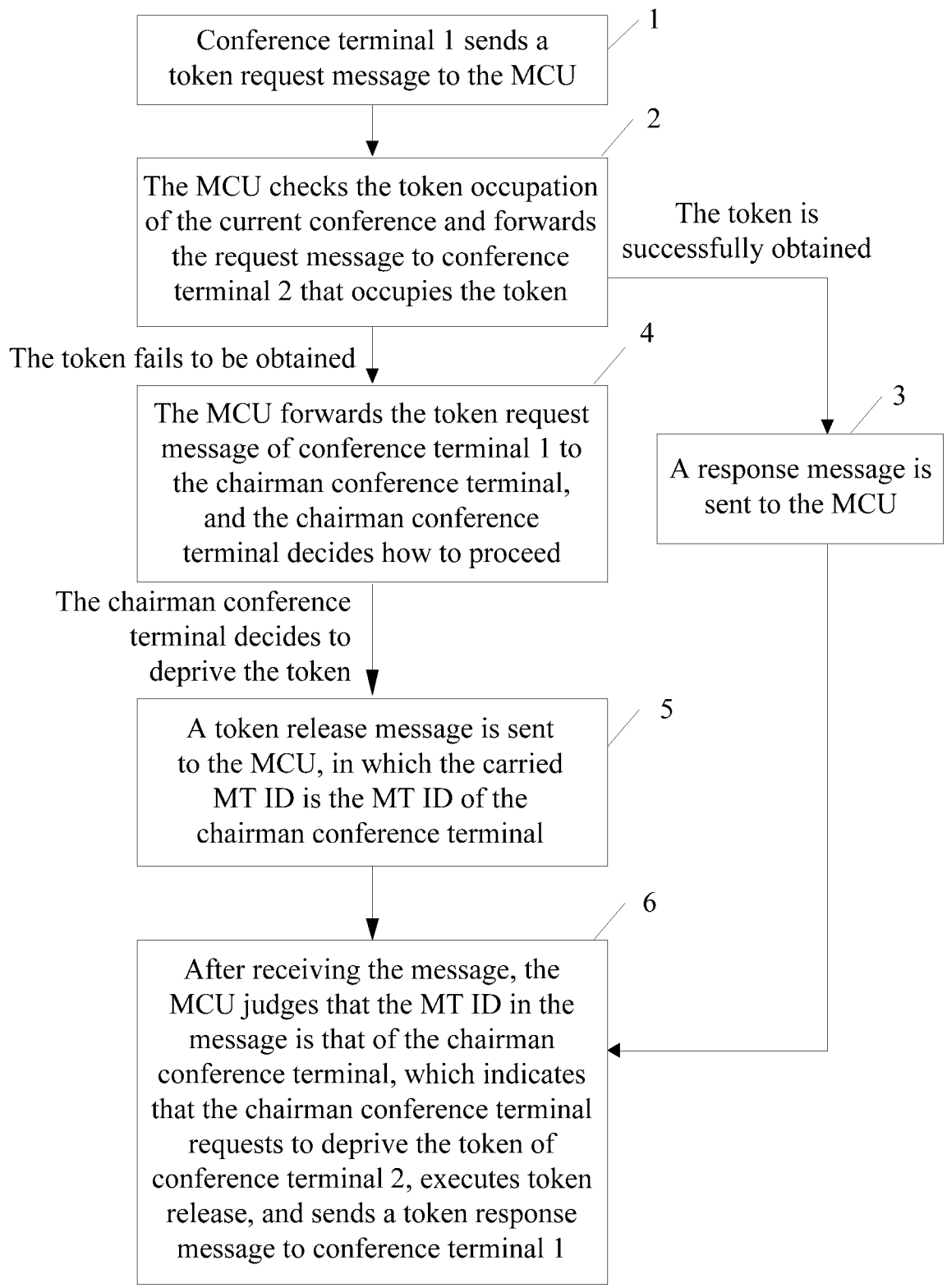
FIG. 3 is a flowchart for controlling a token for an auxiliary stream provided in a second embodiment of the present invention.

FIG. 2 shows an application scenario provided in a specific embodiment of the implementation mode. In this embodiment, an MCU 20 is connected to a Chairman conference terminal 22, a first conference terminal 24, and a second conference terminal 26. While connection to two conference terminals is depicted, it is to be appreciated that connection of the MCU 20 to more than two conference terminals is encompassed by the present invention. FIG. 3 shows an execution process. The token in the current conference is held by the conference terminal 2 (26), which sends the auxiliary stream. When the conference terminal 1 (24) wants to send the auxiliary stream, the following blocks are performed:

Block 1: Conference terminal 1 (24) sends the token request message presentationTokenRequest to the MCU 20.

Block 2: The MCU 20 checks the token holding condition of the current conference, and forwards the request message to conference terminal 2 (26) as the token holder. If conference terminal 2 agrees to release the token, the process proceeds to block 3. If conference terminal 2 has no response or refuses to release the token, the process proceeds to block 4.

Block 3: Conference terminal 2 sends the response message presentationTokenResponse to the MCU, and then the process proceeds to block 6 where the MCU sends a token response message to conference terminal 1.

Block 4: The MCU 20 forwards the token request message from conference terminal 1 to the chairman conference terminal 22, and the chairman conference terminal determines how to proceed. The chairman conference terminal 22 can decide whether to execute token depriving based on the MT ID of conference terminal 1 and the internal policy. If the chairman conference terminal decides to deprive the token of conference terminal 2, the process proceeds to block 5.

Block 5: The chairman conference terminal 22 sends a token depriving request message presentationTokenRelease to the MCU 20, in which the carried MT ID is the MT ID of the chairman conference terminal.

Block 6: Upon receiving the message, the MCU 20 judges that the MT ID in the message is the MT ID of the chairman conference terminal, which indicates that the chairman decides to deprive the token of the current conference token owner (conference terminal 2), executes the token release operation, and sends the token response message to conference terminal 1.

In this case, the MCU 20 has two modes to forcibly release the token of conference terminal 2:

Mode 1: The MCU 20 sends a token depriving message presentationTokenRelease to conference terminal 2 and a token response message presentationTokenResponse to conference terminal 1, and updates the state of the token in the conference to idle.

Mode 2: The MCU sends a token request message presentationTokenRequest to conference terminal 2, and sets the symmetryBreaking field in the message to 0. Then, the MCU sends a token response message presentationTokenResponse to conference terminal 1, and updates the state of the token in the conference to idle.

After obtaining the response from the MCU, the conference terminal 1 can open the auxiliary stream channel to send auxiliary stream information to the conference, and periodically send the token occupation indication presentationTokenIndicateOwner to the MCU. The MCU broadcasts the message to other participating terminals to state that the token is occupied by conference terminal 1.

In this embodiment, a token request message is forwarded to the chairman conference terminal 22, and the chairman conference terminal decides whether to deprive the token. If the token needs to be deprived, the chairman conference terminal 22 instructs the MCU to execute token depriving. In this way, the problem that the token in a multi-point double-stream conference is occupied by a certain conference terminal for a long time and thus the emergent and important auxiliary steams cannot be sent can be solved, and the chairman conference terminal can fully control the token, thus meeting the need of users in a multi-point double-stream conference.

In the third embodiment of the present invention, a method for controlling a token for an auxiliary stream in a multi-point double-stream conference is provided. For a scenario where two chairman conference terminals exist in a multi-point double-stream conference in this embodiment, the two chairman conference terminals are divided into a chairman conference terminal for controlling the main stream images and a chairman conference terminal for controlling the auxiliary stream images. The method for controlling the token can be as follows: The conference terminal requesting the depriving of the token sends a token request message to the chairman conference terminal for auxiliary streams. The chairman conference terminal for auxiliary streams forwards this message to the MCU. The MCU obtains the token from the token owner (in the same way as specified in the second embodiment). If the MCU fails to obtain the token, the MCU forwards the message to the chairman conference terminal for auxiliary streams. The subsequent process is the same as that in the second embodiment.

This embodiment applies to the scenario where two chairman conference terminals exist. To distinguish between the conference terminals in terms of main stream and auxiliary stream, in this embodiment, the token request message is sent to the chairman conference terminal for auxiliary steams, and the chairman conference terminal for auxiliary streams forwards the message to the MCU, so that the MCU knows that the auxiliary stream token needs to be controlled. In this case, the token is fully controlled, the requirement of users in a multi-point double-stream conference is met, and the problem that the token in a multi-point double-stream conference is occupied by a certain conference terminal for a long time and thus the emergent and important auxiliary steams cannot be sent is solved.

In the fourth embodiment of the present invention, a method for controlling a token for an auxiliary steam in a multi-point double-stream conference is provided. The method is described as follows:

In a scenario where a chairman conference terminal exists, and the conference terminal requesting a token knows the MT ID of the chairman conference terminal, the conference terminal requesting a token simulates the chairman conference terminal to send a token depriving request message to the MCU. The message contains the MT ID of the chairman conference terminal. Upon receiving the message, the MCU deems that the conference terminal wants to forcibly obtain the token, and then the MCU deprives the token. The operation of depriving the token by the MCU is the same as that stated in the first embodiment.

The preceding operation applies to the scenario where no chairman conference terminal exists. In this case, a virtual MT ID of the chairman conference terminal can be preset. This MT ID equals to the MT ID of the chairman conference terminal, and can instruct the MCU to execute related operations according to the contents of this message. That is, the MCU deems that the message that carries this MT ID is a message sent by the chairman conference terminal, and then executes related operations according to the contents of this message.

Figure 4:
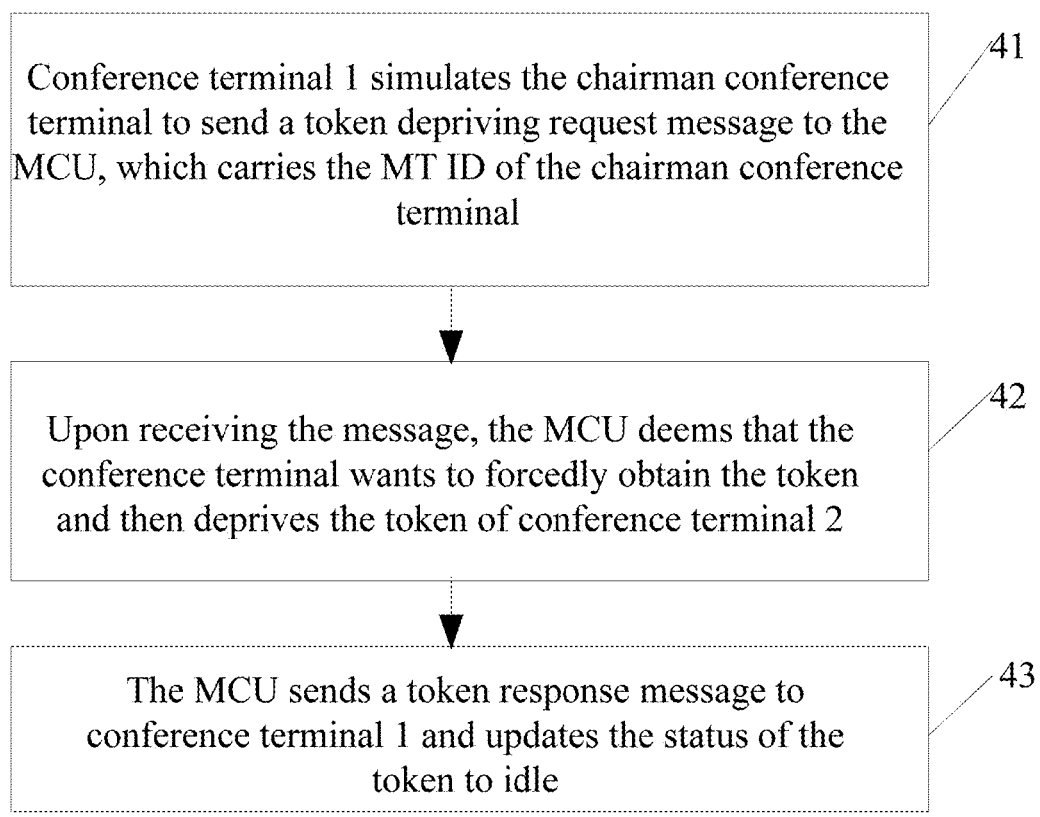
FIG. 4 is a flowchart for controlling a token for an auxiliary stream provided in a fourth embodiment of the present invention.

FIG. 2 shows an implementation mode of this embodiment. FIG. 4 is the flowchart of the implementation mode. In the current conference, the token is held by conference terminal 2 that sends auxiliary streams. When conference terminal 1 wants to send auxiliary streams, the following blocks are performed:

Block 41: Conference terminal 1 simulates the chairman conference terminal to send a token depriving request presentationTokenRelease to the MCU, which carries the MT ID of the chairman conference terminal.

Block 42: Upon receiving the message, the MCU deems that the conference terminal wants to forcibly obtain the token and then deprives the token of conference terminal 2 in the same way as that stated in the first embodiment.

Block 43: The MCU sends a token response message to conference terminal 1, and updates the status of the token in the conference to idle.

Upon receiving the response from the MCU, conference terminal 1 can open the auxiliary stream channel to send auxiliary stream information to the conference, and periodically send the token occupation indication presentationTokenIndicateOwner to the MCU. The MCU broadcasts the message to other participating terminals to state that the token is occupied by conference terminal 1.

In this embodiment, the conference terminal requesting a token simulates the chairman conference terminal to send a token request message to the MCU. In this way, a solution is provided to the problem of a token in a multi-point double-stream conference being occupied by a certain conference terminal for an extended time and inhibiting sending of the emergent and important auxiliary steams, and the chairman conference terminal can fully control the token, thus meeting the need of users in a multi-point double-stream conference.

Figure 5:
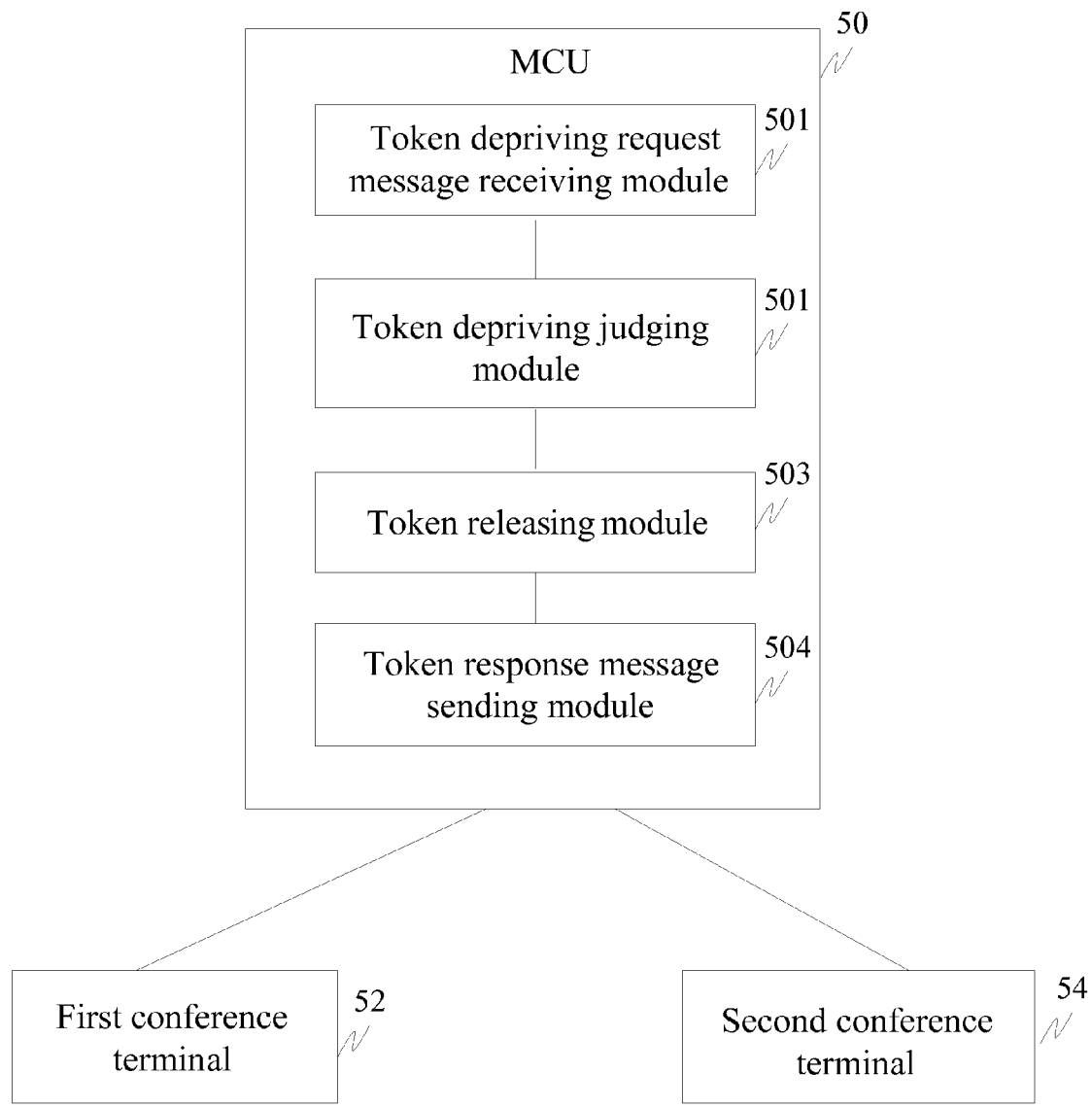
FIG. 5 shows a system module for controlling a token for an auxiliary stream provided in a fifth embodiment of the present invention.

In the fifth embodiment of the present invention, a system for controlling a token for an auxiliary stream in a multi-point double-stream conference is provided, as shown in FIG. 5. The system may include an MCU 50 and at least two conference terminals (a first conference terminal 52 and a second conference terminal 54). In the multi-point double-stream conference, when the token is held by the first conference terminal 52 and the auxiliary stream is sent, the second conference terminal 54 requests the depriving of the token, and the MCU 50 is adapted to receive a token depriving request message, judge whether to execute the token depriving according to an identifier (ID) carried in the token depriving request message, and deprive the token of the first conference terminal 52 when it is determined to execute the token depriving. The ID carried in the token depriving request message may be an MCU Terminal (MT) ID.

The MCU 50 may include a token depriving request message receiving module 501, a token depriving judging module 502, a token releasing module 503 and a token response message sending module 504. The token depriving request message receiving module 501 is adapted to receive the token depriving request messages from the conference terminals in the multi-point double-stream conference; The token depriving judging module 502 is adapted to determine whether to deprive the token from the first conference terminal 52 that owns the token according to the MT ID in the received token depriving request message in the same way as stated in the first embodiment; The token releasing module 503 is adapted to receive the judgment result of the token depriving judging module 502, execute token release in the same way as that stated in the first embodiment when the MCU 50 decides to deprive the token and receive the token depriving request response message of the conference terminal that owns the token; The token response message sending module 504 is adapted to send a token response message to the second conference terminal 54 requesting the token according to the token depriving request response message received by the token releasing module 503.

In this embodiment, a token depriving judging module 502 is set in the MCU 50 to allow the MCU 50 to deprive the current token according to the actual user requirement, thus implementing fully control of the MCU 50 over the token, and meeting user requirements.

Figure 6:
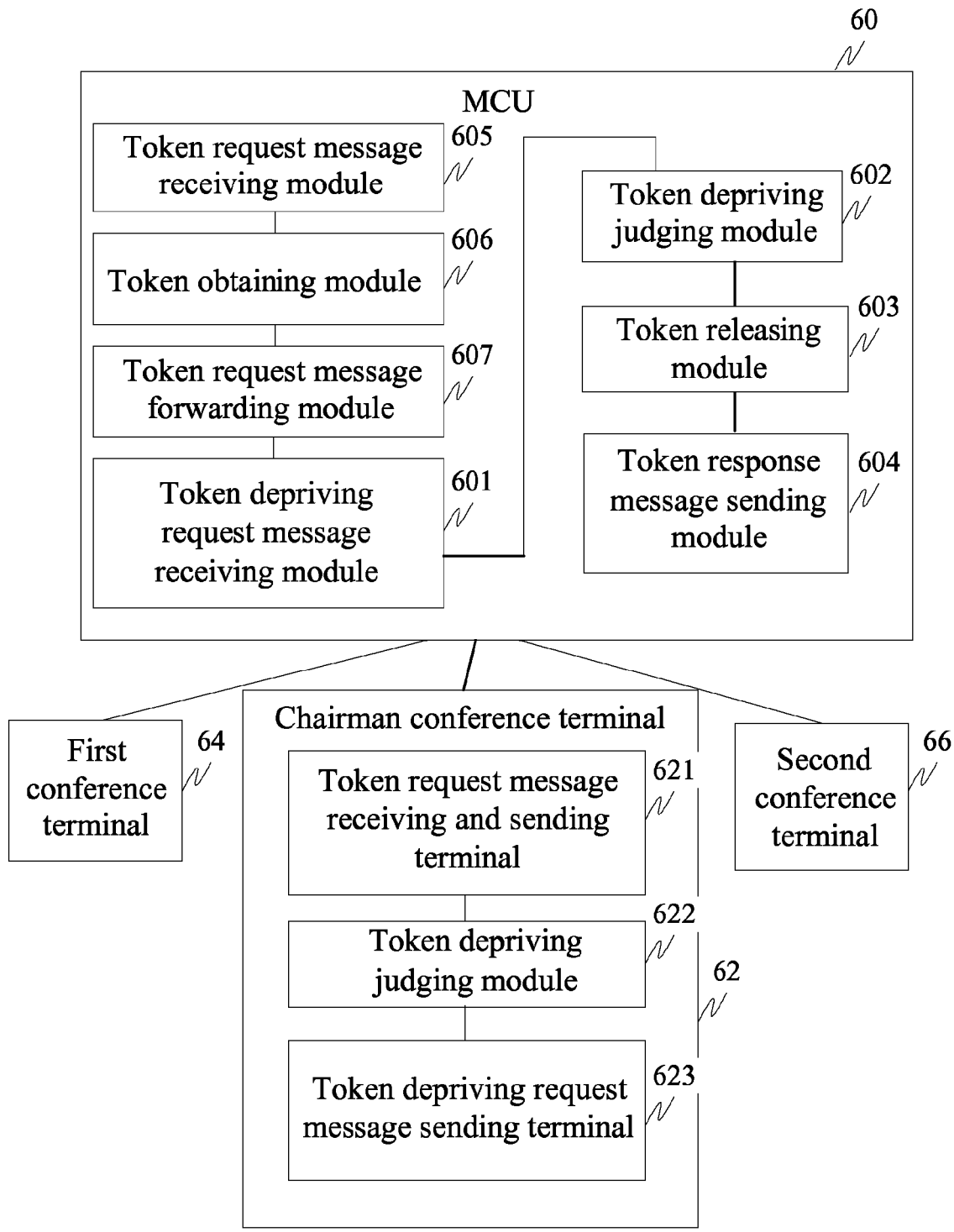
FIG. 6 shows a system module for controlling a token for an auxiliary stream provided in a sixth embodiment of the present invention.

In the sixth embodiment of the present invention, a system for controlling a token for an auxiliary stream in a multi-point double-stream conference is provided, as shown in FIG. 6. The system may include an MCU 60, a chairman conference terminal 62, and at least two conference terminals (a first conference terminal 64 and a second conference terminal 66). In the multi-point double-stream conference, when the token is held by the first conference terminal 64 and the auxiliary stream is sent, the second conference terminal 66 requests the depriving of the token, the MCU 60 is adapted to receive the token depriving request message, judge whether to execute the token depriving according to the MT ID carried in the token depriving request message, and deprive the token of the first conference terminal 64 when the MCU 60 decides to execute the token depriving.

The MCU 60 may include a token depriving request message receiving module 601, a token depriving judging module 602, a token releasing module 603 and a token response message sending module 604. The token depriving request message receiving module 601 is adapted to receive a token depriving request message that carries an MT ID, which can be sent by a conference terminal or the chairman conference terminal 62; the token depriving judging module 602 is adapted to determine whether to deprive the token from the first conference terminal 64 that owns the token according to the MT ID in the received token depriving request message in the same way as stated in the first embodiment; the token releasing module 603 is adapted to receive the judgment result of the token depriving judging module 602, execute token release when the MCU decides to deprive the token and receive the token depriving request response message of the conference terminal that owns the token; the token response message sending module 604 is adapted to send a token response message to the conference terminal requesting the token according to the token depriving request response message received by the token depriving request module.

If the token request message received by the MCU 60 is sent by a conference terminal, the MCU 60 may further include:

a token request message receiving module 605, adapted to receive a token request message from a conference terminal in a multi-point double-stream conference; a token obtaining module 606, adapted to obtain the token from the conference terminal that owns the token according to the received token request message and sends the token obtaining result; and a token request message forwarding module 607, adapted to receive the token obtaining result from the token obtaining module 606 and forward the token request message to the chairman conference terminal 62 when the MCU 60 fails to obtain the token.

The chairman conference terminal 62 is adapted to receive the token request message, and judge whether to execute token depriving according to the MT ID in the token request message. When it decides to deprive the token, the chairman conference terminal 62 sends the token depriving request message to the MCU 60. The message carries the MT ID of the chairman conference terminal 62.

The chairman conference terminal 62 may include:

a token request message receiving and sending terminal 621, adapted to receive a token request message that is sent by the MCU 60 or a conference terminal; and send the token request message to the MCU 60 when the message is sent by a conference terminal;

a token depriving judging module 622, adapted to determine whether to deprive the token of the conference terminal that owns the token according to the MT ID carried in the received token request message and send the judgment result; and a token depriving request message sending module 623, adapted to receive the judgment result of the token depriving judging module 622 and send the token depriving request message that carries the MT ID of the chairman conference terminal 62 to the MCU 60 when the token needs to be deprived.

In a scenario where two chairman conference terminals exist (not shown in the figure), the two chairman conference terminals are divided into the chairman conference terminal for controlling the main streams and the chairman conference terminal for controlling the auxiliary streams. The preceding chairman conference terminal is the chairman conference terminal for controlling the auxiliary streams.

In this embodiment, the chairman conference terminal determines whether to execute token depriving, and instructs the MCU to execute token depriving when it decides that the token needs to be deprived. In this way, the chairman conference terminal fully controls the token, meeting the requirements of actual conference users.

In conclusion, in the embodiment of the present invention, the MCU executes token depriving according to the received token depriving request or order, thus solving the problem that the auxiliary stream token is held by a certain conference terminal for a long time and the sending of an emergent and important auxiliary stream is disturbed, realizing the absolute control of the auxiliary stream token in a multi-point double-stream conference, and meeting the need of users.

The foregoing sections describe the specific implementation of the present invention. However, all the modifications or replacements made by those skilled in the art in the technical range disclosed by the present invention are protected by the present invention. Therefore, the protection scope of the present invention is subject to the protection scope in claims.

What is claimed is:

1. A method for controlling a token for an auxiliary stream in a multi-point double-stream conference performed by a multi-point control unit (MCU), the method comprising:
   receiving a token depriving request message for a token which is occupied by a first conference terminal in the multi-point double-stream conference sent by a second conference terminal, wherein the token depriving request message includes an identifier (ID) of the second conference terminal, wherein the ID of the second conference terminal is an MCU Terminal (MT) number that is assigned by the MCU;
   upon receiving the token depriving request message, determining to deprive the token which is occupied by the first conference terminal upon determining that the MT number of the second conference terminal exists in an MT number pool, wherein the MT number pool comprises multiple MT numbers each of which have permission to deprive a token for an auxiliary stream; and
   after determining to deprive the token which is occupied by the first conference terminal, depriving the token from the first conference terminal by sending a token request message to the first conference terminal which occupies the token,
   wherein the token request message is an H.239 protocol message that includes a symmetryBreaking field set to a field value of "0" indicating that the first conference terminal must release the token occupied by the first conference terminal.

2. The method according to claim 1, further comprising:
   receiving a token response message responsive to the token request message from the first conference terminal; and
   sending the token response message to the second conference terminal;
   receiving from the second conference terminal a message indicating that the token is occupied by the second conference terminal; and
   sending the message indicating that the token is occupied by the second conference terminal to a plurality of conference terminals including the first conference terminal.

3. The method according to claim 1, further comprising:
   determining that the second conference terminal has a highest priority to get the token occupied by the first conference terminal among multiple conference terminals requesting the token occupied by the first conference terminal.

4. A system for controlling a token for an auxiliary stream in a multi-point double-stream conference, comprising:
   a second conference terminal configured to send a token depriving request message for a token which is occupied by a first conference terminal in the multi-point double-stream conference, wherein the token depriving request message includes an identifier (ID) of the second conference terminal, wherein the ID of the second conference terminal is a multi-point control unit (MCU) Terminal number (MT number) that is assigned by an MCU; and
   the multi-point control unit (MCU) configured to:
   receive the token depriving request message sent by the second conference terminal;
   determine to deprive the token which is occupied by the first conference terminal upon determining that the MT number of the second conference terminal exists in an MT number pool, wherein the MT number pool comprises multiple MT numbers each of which have permission to deprive a token for an auxiliary stream, upon receiving the token depriving request message; and
   deprive the token from the first conference terminal by sending a token request message to the first conference terminal which occupies the token, after determining to deprive the token which is occupied by the first conference terminal,
   wherein the token request message is an H.239 protocol message that includes a symmetryBreaking field set to a field value of "0" indicating that the first conference terminal must release the token occupied by the first conference terminal.

5. The system according to claim 4, wherein the MCU is further configured to:
   receive a token response message responsive to the token request message from the first conference terminal;
   send the token response message to the second conference terminal;
   receive from the second conference terminal a message indicating that the token is occupied by the second conference terminal; and
   sending the message indicating that the token is occupied by the second conference terminal to a plurality of conference terminals including the first conference terminal.

6. A multi-point control unit (MCU), comprising:
   a receiver configured to receive a token depriving request message sent by a second conference terminal in a multi-point double-stream conference when a token is occupied by a first conference terminal, the token depriving request message including an identifier (ID) of the second conference terminal, wherein the ID of the second conference terminal is an MCU Terminal (MT) number that is assigned by the MCU; and
   a processor coupled to the receiver and configured to:
   determine to deprive the token occupied by the first conference terminal upon determining that the MT number of the second conference terminal exists in an MT number pool, wherein the MT number pool comprises multiple MT numbers each of which have permission to deprive a token for an auxiliary stream, upon receiving the token depriving request message; and
   deprive the token occupied by the first conference terminal from the first conference terminal by sending a token request message to the first conference terminal,
   wherein the token request message is an H.239 protocol message that includes a symmetryBreaking field set to a field value of "0" indicating that the first conference terminal must release the token occupied by the first conference terminal.

7. The MCU according to claim 6, wherein the receiver is configured to receive a token response message responsive to the token request message from the first conference terminal, and the MCU further comprises
a transmitter configured to send the token response message to the second conference terminal.

* * * * *